United States Patent
Sekiguchi (10) Patent No.: US 10,086,574 B2
(45) Date of Patent: Oct. 2, 2018

(54) FLAT TIRE REPAIR LIQUID CONTAINER

(71) Applicant: The Yokohama Rubber Co., LTD., Minato-ku, Tokyo (JP)

(72) Inventor: Takumi Sekiguchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 161 days.

(21) Appl. No.: 15/304,370

(22) PCT Filed: Apr. 10, 2015

(86) PCT No.: PCT/JP2015/061271
§ 371 (c)(1),
(2) Date: Oct. 14, 2016

(87) PCT Pub. No.: WO2015/159827
PCT Pub. Date: Oct. 22, 2015

(65) Prior Publication Data
US 2017/0043544 A1 Feb. 16, 2017

(30) Foreign Application Priority Data
Apr. 16, 2014 (JP) ................................ 2014-084520

(51) Int. Cl.
*B29C 73/16* (2006.01)
*B65D 41/28* (2006.01)
(Continued)

(52) U.S. Cl.
CPC ........ *B29C 73/166* (2013.01); *B65D 39/0052* (2013.01); *B65D 41/0435* (2013.01);
(Continued)

(58) Field of Classification Search
CPC .............. B29C 73/166; B65D 39/0052; B65D 41/0435; B65D 41/28; B65D 47/06;
(Continued)

(56) References Cited

U.S. PATENT DOCUMENTS

| 7,389,800 B2 * | 6/2008 | Hickman | ............ B29C 73/166 |
| | | | 141/26 |
| 7,748,295 B2 * | 7/2010 | Hong | .................. B29C 73/166 |
| | | | 137/223 |

(Continued)

FOREIGN PATENT DOCUMENTS

| JP | 2009-507682 | 2/2009 |
| JP | 2010-167742 | 8/2010 |

(Continued)

OTHER PUBLICATIONS

International Search Report for International Application No. PCT/JP2015/061271 dated May 19, 2015, 4 pages, Japan.

*Primary Examiner* — Andrew Perreault
(74) *Attorney, Agent, or Firm* — Thorpe North & Western (57) ABSTRACT

A flat tire repair liquid container is provided with: a closing stopper, which is formed from a non-elastomer material and is capable of sliding inside a flow channel; and a sealing member, which is formed from an elastomer material, is disposed in a ring shape conforming to an inner wall surface of a flow channel, closes a gap between the closing stopper and the flow channel, and holds the closing stopper at a predetermined position. During storage, the closing stopper is engaged with the sealing member to close the flow channel. During flat tire repair work, the closing stopper is pushed out from the sealing member by pressure inside the container and moved toward the outer side of the container in the flow channel to open the flow channel.

8 Claims, 8 Drawing Sheets

(51) Int. Cl.
*B65D 39/00* (2006.01)
*B65D 51/18* (2006.01)
*B65D 41/04* (2006.01)
*B65D 47/06* (2006.01)
*B65D 53/02* (2006.01)
*B29L 30/00* (2006.01)

(52) U.S. Cl.
CPC ............ *B65D 41/28* (2013.01); *B65D 47/06* (2013.01); *B65D 51/18* (2013.01); *B65D 53/02* (2013.01); *B29L 2030/00* (2013.01); *B65D 2251/009* (2013.01); *B65D 2251/0015* (2013.01); *B65D 2251/0025* (2013.01); *B65D 2251/0028* (2013.01); *B65D 2251/0071* (2013.01)

(58) Field of Classification Search
CPC ............ B65D 51/18; B65D 53/02; B65D 2251/0015; B65D 2251/0025; B65D 2251/0028; B65D 2251/0071; B65D 2251/009; B29L 2030/00
USPC .......................................... 220/254.1; 141/38
See application file for complete search history.

(56) References Cited

U.S. PATENT DOCUMENTS

| | | | | |
|---|---|---|---|---|
| 8,205,645 | B2* | 6/2012 | Dowel | B29C 73/166 141/38 |
| 8,640,745 | B2* | 2/2014 | Ji | B29C 73/166 141/105 |
| 8,746,293 | B2* | 6/2014 | Chou | B60S 5/04 141/38 |
| 9,138,946 | B2* | 9/2015 | Kojima | B29C 73/166 |
| 9,156,212 | B2* | 10/2015 | Taniguchi | B29C 73/166 |
| 9,193,229 | B2* | 11/2015 | Hong | B29C 73/166 |
| 9,333,715 | B2* | 5/2016 | Kono | B29C 73/166 |
| 9,415,751 | B2* | 8/2016 | Taniguchi | B29C 73/025 |
| 2008/0264540 | A1 | 10/2008 | Dowel | |
| 2013/0068346 | A1 | 3/2013 | Ji | |
| 2014/0224380 | A1 | 8/2014 | Kono | |

FOREIGN PATENT DOCUMENTS

| | | |
|---|---|---|
| JP | 2013-067161 | 4/2013 |
| JP | 3189236 | 2/2014 |
| WO | WO 2007/030896 | 3/2007 |
| WO | WO 2013/040880 | 3/2013 |
| WO | WO 2013/047420 | 4/2013 |

* cited by examiner

FLAT TIRE REPAIR LIQUID CONTAINER

TECHNICAL FIELD

The present technology relates to a flat tire repair liquid container, and more particularly relates to a flat tire repair liquid container that makes it possible to prevent liquid leakage during storage and prevent flow channel opening problems.

BACKGROUND ART

In recent years, when a tire mounted to a vehicle is punctured, flat tire repair liquid is injected into the tire via the tire valve to temporarily repair the puncture. For example, a flat tire repair kit that is configured to supply flat tire repair liquid stored in the flat tire repair liquid container to the interior of the tire via a tube is employed as an injection device for such flat tire repair liquid. Employing such a flat tire repair kit eliminates the need to provide the vehicle with a spare tire, which makes it possible to save resources and reduce the weight of the vehicle. There is a further advantage that the space in the vehicle where the spare tire would have been provided can be used for other purposes.

A flat tire repair liquid container includes, for example, a container main body including a container body storing a flat tire repair liquid and an opening, and a cap including a mounting portion mounted to the opening during flat tire repair work, a dispensing portion that dispenses the flat tire repair liquid outside of the container, and a flow channel that connects the mounting portion and the dispensing portion. In such a configuration, providing a closing stopper formed from rubber in the flow channel has been proposed as a way of preventing the flat tire repair liquid from leaking out from the flow channel during storage (see Japanese Unexamined Patent Application Publication No. 2013-067161, for example).

With the closing stopper proposed in Japanese Unexamined Patent Application Publication No. 2013-067161, the flow channel is opened by pressure of air supplied to the interior of the container during flat tire repair work that moves the closing stopper within the flow channel to a predetermined position (an end of the flow channel positioned toward the outer side of the container). However, the closing stopper formed from rubber deforms easily, and there is thus a problem that the closing stopper deforms under the pressure of the air when moving within the flow channel, becomes stuck partway along the flow channel and blocks the flow channel, and prevents the flow channel from opening correctly (in other words, an opening problem occurs). Such a rubber-formed closing stopper is prone to dimensional variations during molding, which causes a problem in that if the diameter of the closing stopper is too much greater than a desired dimension, the closing stopper cannot move smoothly within the flow channel and will cause opening problems, whereas if the diameter of the closing stopper is too much smaller, the closing stopper cannot sufficiently prevent the flat tire repair liquid from leaking.

SUMMARY

The present technology provides a flat tire repair liquid container that makes it possible to prevent liquid leakage during storage and prevent flow path opening problems.

A flat tire repair liquid container of the present technology is a flat tire repair liquid container provided with: a container main body including a container body and an opening, the container body storing a flat tire repair liquid; a cap including a mounting portion, a dispensing portion, and a flow channel, the mounting portion being mounted to the opening during flat tire repair work, the dispensing portion being configured to dispense the flat tire repair liquid outer side of the container, the flow channel connecting the mounting portion and the dispensing portion; and a stopping mechanism including a closing stopper formed from a resin that is a non-elastomer material, the closing stopper being capable of sliding within the flow channel, a sealing member formed from an elastomer material, the sealing member being disposed in a ring shape conforming to an inner wall surface of the flow channel and configured to close a gap between the closing stopper and the flow channel and to hold the closing stopper at a predetermined position, and a shape-retaining member configured to combine with the closing stopper during storage so as to keep the closing stopper in a restrained state in which the closing stopper does not disengage from the sealing member and to disengage from the closing stopper during flat tire repair work so as to release the closing stopper from the restrained state. In such a flat tire repair liquid container, the closing stopper includes a stopper portion that blocks the flow channel, a recessed portion that is adjacent to a side of the stopper portion positioned toward an inner side of the container and engages with the sealing member, and a plurality of holding portions that are adjacent to a side of the recessed portion positioned toward the inner side of the container, project toward the inner side of the container from a periphery of an end surface of the closing stopper positioned toward the inner side of the container, and hold the shape-retaining member; the shape-retaining member includes a body portion held by the holding portion when closed, a recessed portion surrounded by tip portions of the holding portions when open, an outer stopper having a diameter greater than the body portion in an end portion of the shape-retaining member positioned toward the outer side of the container, and an inner stopper having a diameter greater than an imaginary circle inscribed in the tip portions of the holding portions of the closing stopper in an end portion of the shape-retaining member positioned toward the inner side of the container; and during storage, the closing stopper that is in the restrained state engages with the sealing member and closes the flow channel, during tire repair work, the closing stopper that has been released from the restrained state by the shape-retaining member disengaging from the holding portions and the holding portions deforming toward a center of the closing stopper is pushed out from the sealing member by pressure inside the container and moved toward the outer side of the container in the flow channel to open the flow channel.

In the present technology, as described above, the closing stopper, which is formed of a resin that is a non-elastomer material, and the sealing member, which is formed from an elastomer, are employed as a means for closing the flow channel during storage in order to prevent liquid leakage. Forming the closing stopper from a resin, which is a non-elastomer material, makes it easy to form the closing stopper in a predetermined shape, and dimensional variations of the closing stopper arising during molding can be suppressed. Accordingly, liquid leakage during storage and opening problems in the flow channel can be prevented, and furthermore, the closing stopper can be prevented from deforming under pressure exerted thereon when moving within the flow channel, which makes it possible for the flow channel to open with certainty without the closing stopper becoming stuck partway along the flow channel. Furthermore, as described above, the closing stopper is used in combination with the shape-retaining member that keeps the closing stopper in a restrained state when closed and releases the closing stopper from the restrained state during flat tire repair work. Accordingly, the closing stopper is prevented from being pushed out by the pressure inside the container when closed, which ensures that the flow channel is blocked securely, whereas during flat tire repair work, the closing stopper can be moved with certainty.

In particular, the closing stopper includes the stopper portion that blocks the flow channel, the recessed portion that is adjacent to the side of the stopper portion positioned toward the inner side of the container and engages with the sealing member, and the plurality of holding portions that are adjacent to the side of the recessed portion positioned toward the inner side of the container, project toward the inner side of the container from the periphery of the end surface of the closing stopper positioned toward the inner side of the container, and hold the shape-retaining member, and the holding portions can deform toward the center of the closing stopper when the shape-retaining member disengages from the holding portions during flat tire repair work. Accordingly, because the closing stopper includes the recessed portion, the closing stopper can engage securely with the sealing member during storage and effectively prevent liquid leakage. Additionally, the above-described structure of the holding portions makes it possible to maintain and release the restrained state using a simple structure, and thus during flat tire repair work, the flat tire repair liquid can pass through a gap in the holding portions, which improves the flow of the flat tire repair liquid.

Here, it is preferable that a diameter $R_B$ of the recessed portion be smaller than a diameter $R_A$ of the stopper portion and a diameter $R_C$ of the holding portions in a state where the holding portions hold the shape-retaining member, and the diameter $R_B$ be greater than an inner diameter r of the sealing member. Specifying the diameters of the portions in this manner makes it possible for the closing stopper to securely engage with the sealing member when closed.

In the present technology, it is preferable that an end surface of the closing stopper positioned toward the outer side of the container be a convex surface projecting toward the outer side of the container. As a result, air remaining in the flow channel can escape, which makes it possible for the closing stopper to move smoothly.

In the present technology, it is preferable that the specific gravity of a material from which the shape-retaining member is formed be no less than two. As a result, the disengagement of the shape-retaining member, which is caused by vehicle vibrations or the like, can be prevented during storage, which makes it possible to stabilize the engagement between the closing stopper and the sealing member. Furthermore, during flat tire repair work, the shape-retaining member can be removed using the weight of the shape-retaining member, which makes it possible to easily and securely remove the closing stopper.

In the present technology, it is preferable that a diameter of the body portion of the shape-retaining member that makes contact with the holding portions when closed be 105% to 115% of the diameter of an imaginary circle inscribed in tips of the plurality of holding portions when the closing stopper is in an unloaded state. As a result, the shape-retaining member can be held securely by the holding portions, which in turn makes it possible to prevent the disengagement of the shape-retaining member, which is caused by vehicle vibrations or the like, during storage.

DETAILED DESCRIPTION

A configuration of the present technology will be described below in detail with reference to the accompanying drawings.

Figure 1:
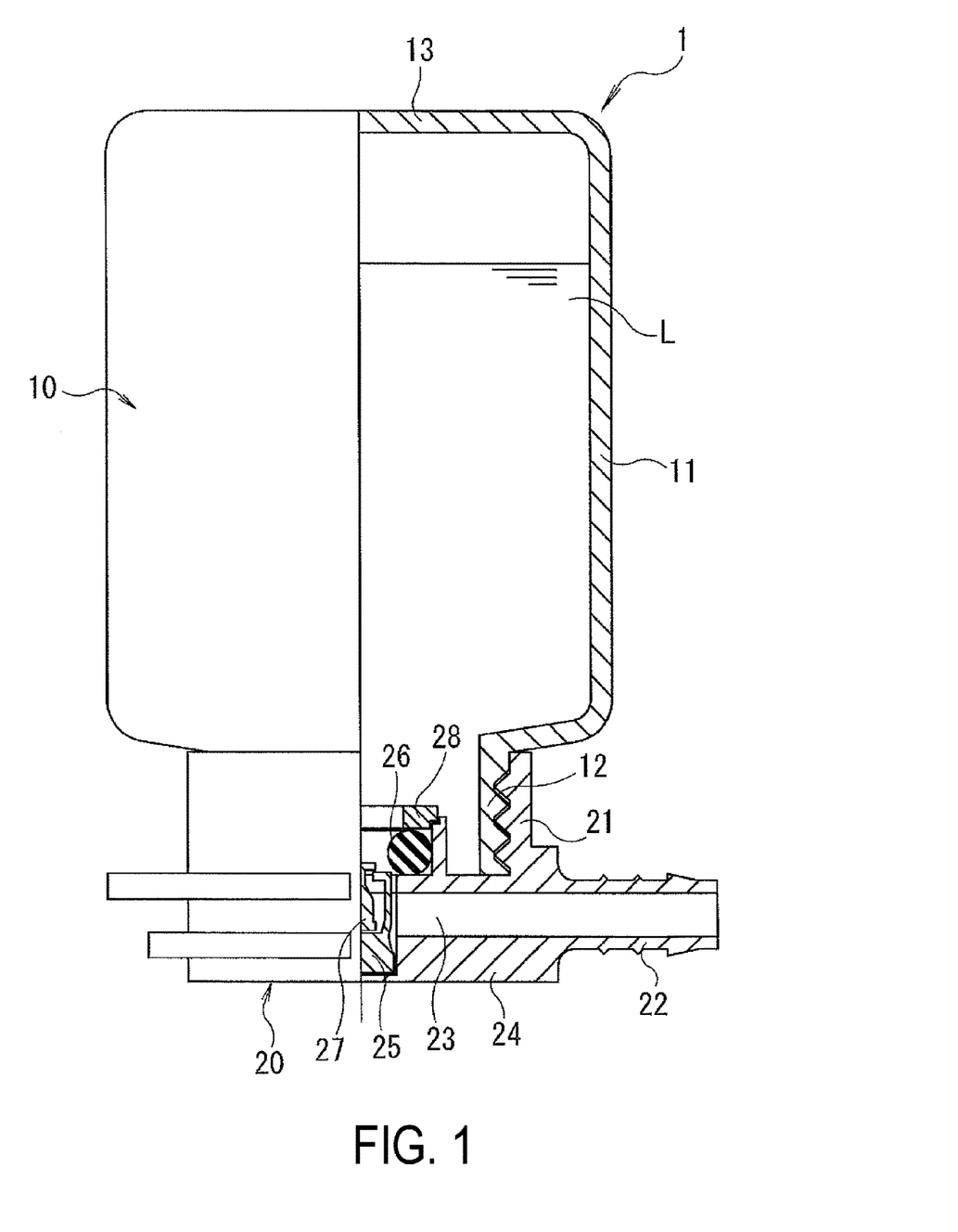
FIG. 1 is a partially cut-out front view of a flat tire repair liquid container according to the present technology.

As illustrated in FIG. 1, a flat tire repair liquid container 1 (called a "container 1" hereinafter) according to the present technology is constituted of a container main body 10 and a cap 20.

The container main body 10 includes a cylindrical container body 11 storing flat tire repair liquid L (called "repair liquid L" hereinafter) that contains, for example, rubber latex, and a cylindrical opening 12 that is positioned on a lower side of the container body 11 when the container main body 10 is inverted and through which the repair liquid L is dispensed during use. When the container 1 is inverted, a bottom 13 of the container body 11 is positioned on a side opposite the opening 12. The opening 12 is sealed by a film (not illustrated). In this embodiment, a screw thread is formed on the outer surface of the opening 12 so as to mate with a screw thread on the cap 20, which will be described later. The container body 11, the opening 12, and the bottom 13 are integrally formed from, for example, a synthetic resin such as polyethylene.

Figure 2:
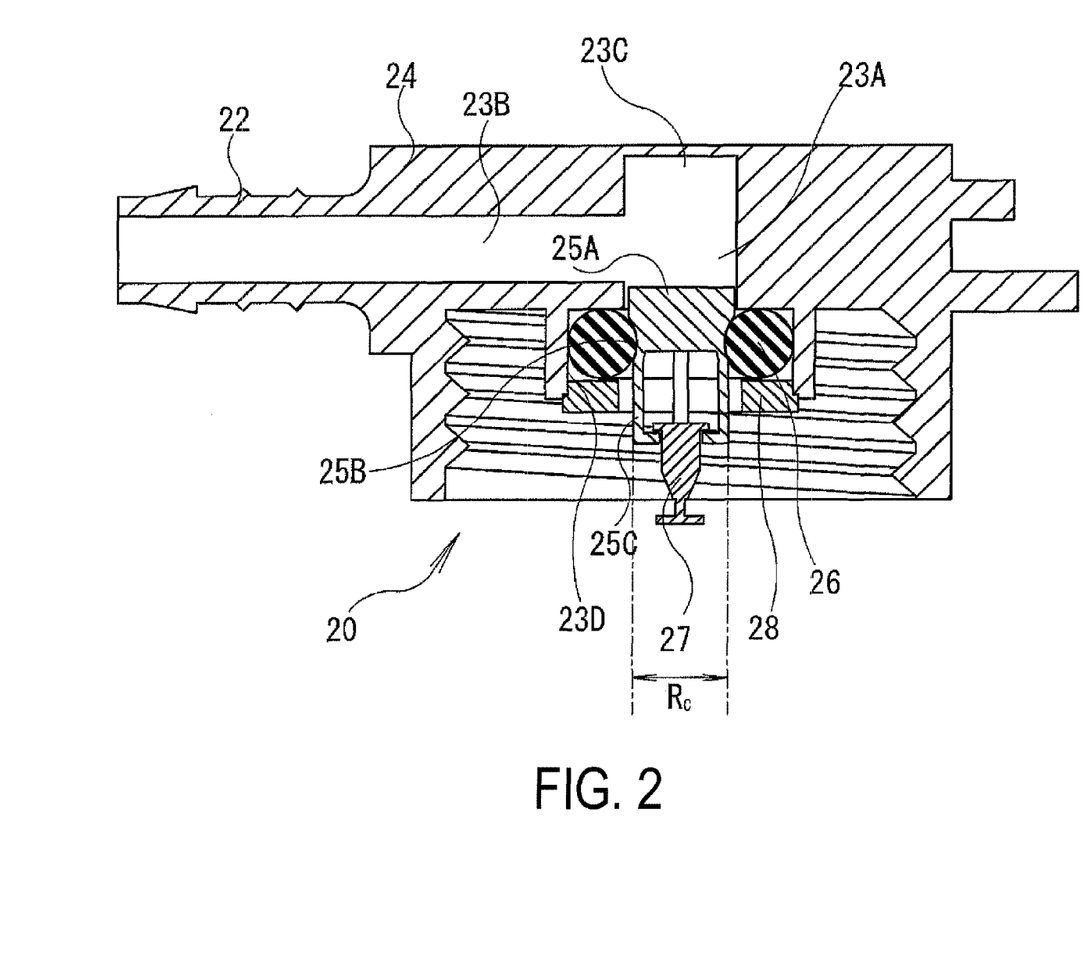
FIG. 2 is an enlarged cross-sectional view illustrating a cap (in an upright state corresponding to a state where a valve is closed) included in the flat tire repair liquid container illustrated in FIG. 1.
Figure 3:
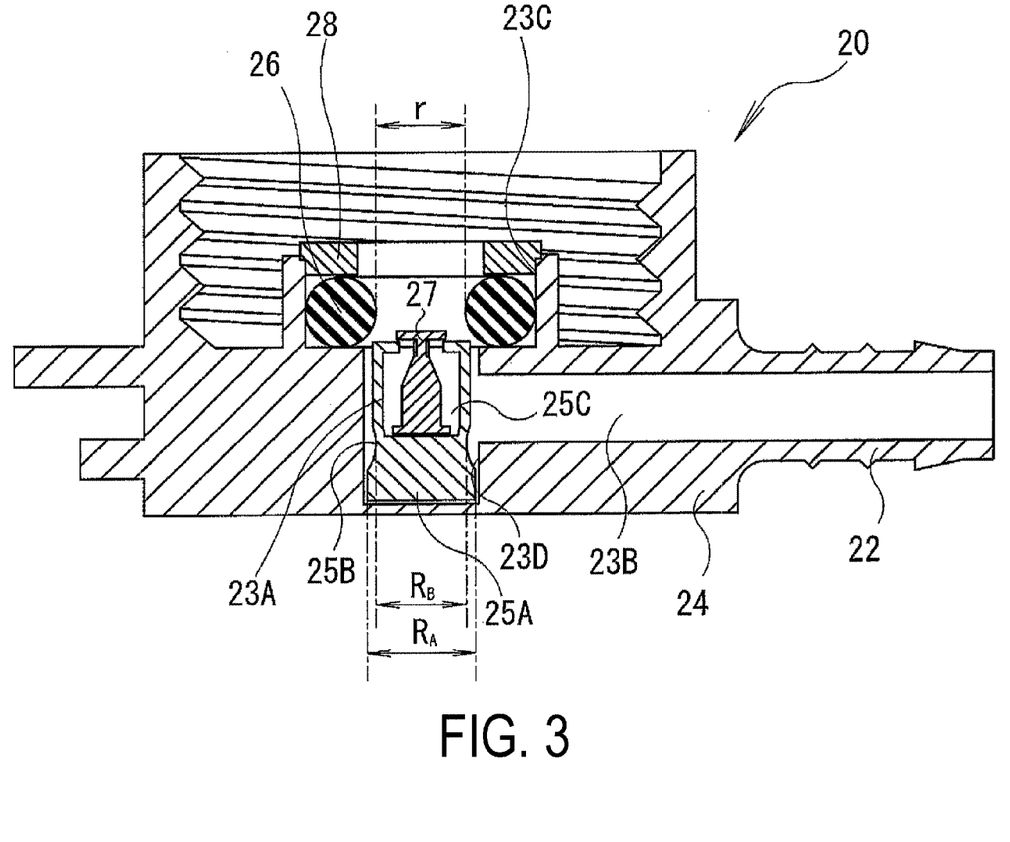
FIG. 3 is an enlarged cross-sectional view illustrating the cap (in an inverted state corresponding to a state where the valve is open) included in the flat tire repair liquid container illustrated in FIG. 1.

As illustrated in an enlarged manner in FIGS. 2 and 3, the cap 20 includes a mounting portion 21 that is mounted to the opening 12 of the container main body 10 during flat tire repair work, a dispensing portion 22 that dispenses the repair liquid L outside of the container, and a flow channel 23 that connects the mounting portion 21 and the dispensing portion 22. The mounting portion 21 has a cylindrical shape, in the inner circumferential surface of which is formed a screw thread that mates with the screw thread in the opening 12 of the container main body 10. In the embodiment illustrated in the drawings, a base portion 24 having a cylindrical shape of the same diameter as the mounting portion 21 is formed integrally with the mounting portion 21. The dispensing portion 22 projects from a side surface of the base portion 24, and the flow channel 23 penetrates into the base portion 24. The flow channel 23 has a vertical hole section 23A extending in an axial direction of the cap 20 from a plane in the base portion 24 positioned toward the mounting portion 21, and a horizontal hole section 23B extending in a direction that intersects with the vertical hole section 23A and connecting to the dispensing portion 22. A retaining section 23C that retains a closing stopper 25 (described later) that has moved toward the outer side of the container during flat tire repair work is provided in an end of the vertical hole section 23A adjacent to the outer side of the container.

In the present technology, a stopping mechanism constituted of the closing stopper 25, a sealing member 26, and a shape-retaining member 27 is provided in the flow channel 23, particularly in the vertical hole section 23A. The closing stopper 25 is formed from a resin that is a non-elastomer material, and the sealing member 26 and the shape-retaining member 27 are formed from an elastomer.

The closing stopper 25 is configured to be capable of sliding within the flow channel 23 (the vertical hole section 23A), and engages in the hole section of the ring-shaped sealing member 26 (described later) when closed. As illustrated in an enlarged manner in FIGS. 4 and 5, the closing stopper 25 includes a stopper portion 25A that actually blocks the flow channel, a recessed portion 25B that is adjacent to the side of the stopper portion 25A positioned toward the inner side of the container and engages with the sealing member 26 (described later), and a plurality of holding portions 25C that are adjacent to the side of the recessed portion 25B positioned toward the inner side of the container and that project toward the inner side of the container from the periphery of an end surface of the closing stopper 25 positioned toward the inner side of the container. Tip portions 25D of the holding portions 25C bend toward the center of the closing stopper 25, and the shape-retaining member 27 (described later) is held by these tip portions 25D.

The sealing member 26 is disposed in a ring shape conforming to an inner wall surface of the flow channel 23 (the vertical hole section 23A). During storage, the sealing member 26 closes a gap between the closing stopper 25 (the recessed portion 25B) and the flow channel 23 (the vertical hole section 23A), and holds the closing stopper 25 at a predetermined position. For example, vulcanized rubber or silicone rubber that has elasticity can be employed as the elastomer material of which the sealing member 26 is formed. In the example illustrated in the drawings, an expanded portion 23D that extends toward the inner side of the container from the base portion 24 and that has an inner diameter greater than other portions of the flow channel 23 (the vertical hole section 23A) is provided at the end of the flow channel 23 (the vertical hole section 23A) positioned toward the inner side of the container. The sealing member 26 is fitted into the expanded portion 23D, and furthermore, a stopper 28 for preventing the sealing member 26 from falling off is attached to the side of the sealing member 26 positioned toward the inner side of the container.

Figure 4:
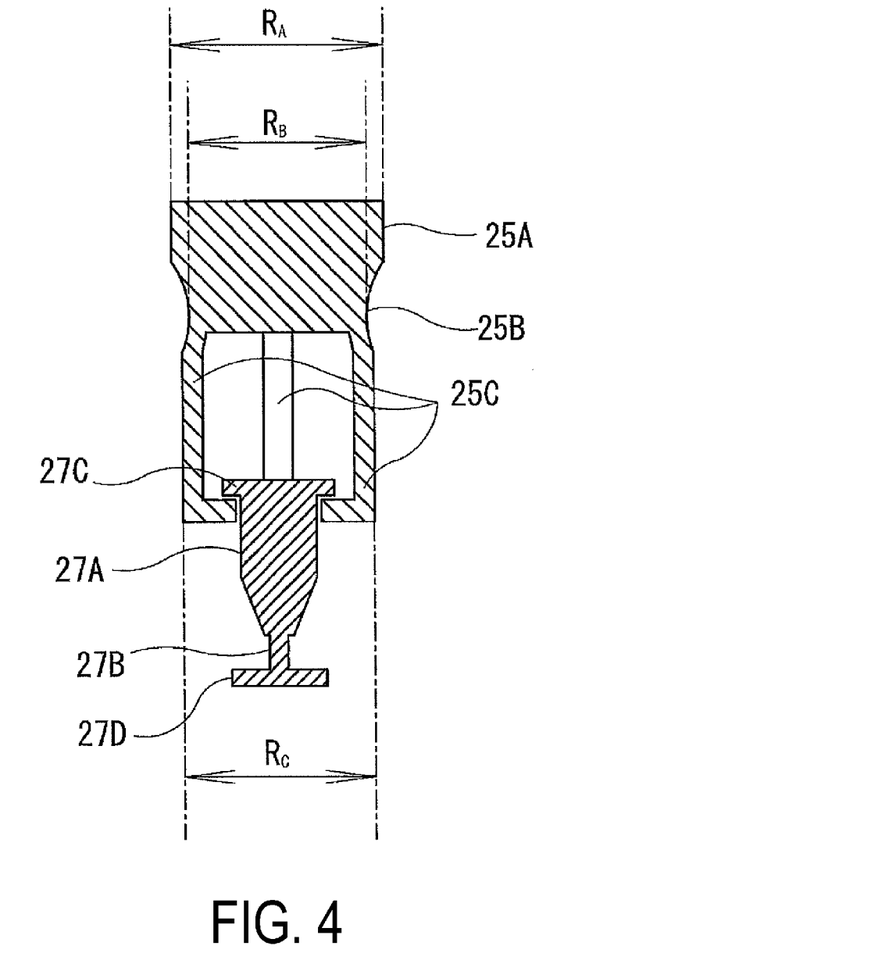
FIG. 4 is an enlarged view illustrating a closing stopper and a shape-retaining member extracted from FIG. 2.
Figure 5:
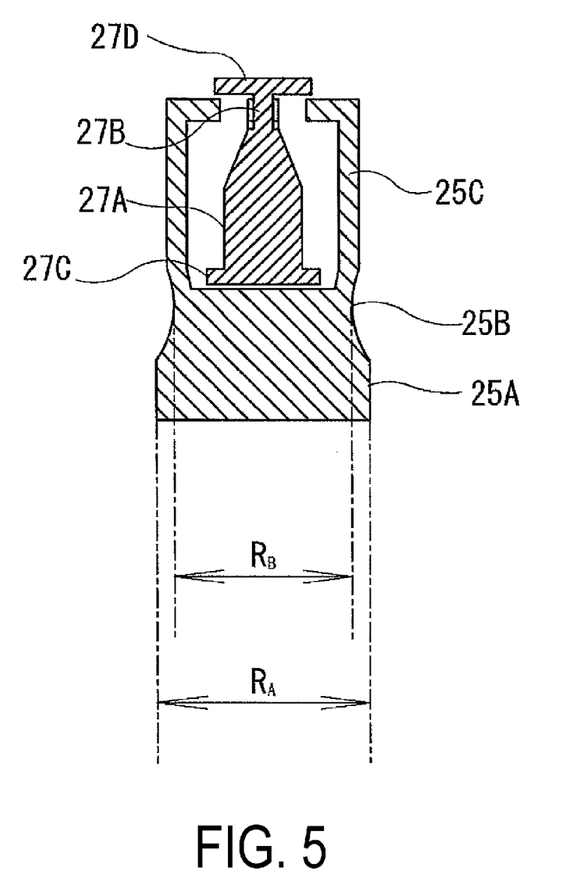
FIG. 5 is an enlarged view illustrating the closing stopper and the shape-retaining member extracted from FIG. 3.

As illustrated in an enlarged manner in FIGS. 4 and 5, the shape-retaining member 27 includes a cylindrical body portion 27A held by the holding portions 25C when closed, and a recessed portion 27B that is surrounded by the tip portions 25D of the holding portions 25C when open. Additionally, a disc-shaped outer stopper 27C having a diameter greater than the body portion 27A is provided in the end portion of the shape-retaining member 27 positioned toward the outer side of the container, and the outer stopper 27C prevents the shape-retaining member 27 from falling out from the holding portions 25C when closed. Likewise, a disc-shaped inner stopper 27D having a diameter greater than an imaginary circle that makes contact with the tip portions 25D of the holding portions 25C of the closing stopper 25 is provided in the end portion of the shape-retaining member 27 positioned toward the inner side of the container, and the inner stopper 27D prevents the shape-retaining member 27 from falling into the holding portions 25C when open.

During storage, the container 1 is placed in an upright state, and thus as illustrated in FIG. 2, in the stopping mechanism configured in this manner, the shape-retaining member 27 moves toward the inner side of the container. The holding portions 25C hold the body portion 27A of the shape-retaining member 227, and the outer stopper 27C of the shape-retaining member 27 catches on the tip portions 25D of the holding portions 25C from the outer side of the container. In this state, the holding portions 25C are restricted from deforming toward the center of the closing stopper 25. As a result, the closing stopper 25 is kept in a restrained state so as not to disengage from the sealing member 26. On the other hand, during flat tire repair work, the container 1 is placed in an inverted state, and thus as illustrated in FIG. 3, the shape-retaining member 27 moves toward the outer side of the container and the inner stopper 27D of the shape-retaining member 27 catches on the tip portions 25D of the holding portions 25C from the inner side of the container. In this state, the recessed portion 27B is located in an area surrounded by the tip portions 25D of the holding portions 25C and the tip portions 25D of the holding portions 25C are not in contact with the shape-retaining member 27, and thus the holding portions 25C are not restrained from deforming toward the center of the closing stopper 25. As a result, when the closing stopper 25 is biased toward the outer side of the container by pressure inside the container, the holding portions 25C are compressed by the sealing member 26 and deformed so as to bend toward the center of the closing stopper 25, and the closing stopper 25 is pushed out from the sealing member 26.

As described above, according to the container of the present technology, the closing stopper 25 is prevented from being pushed out by the pressure inside the container when closed, which ensures that the flow channel 23 is blocked securely. On the other hand, during flat tire repair work, the closing stopper 25 can be moved with certainty. Additionally, the closing stopper 25, which is formed from a resin that is a non-elastomer material, and the sealing member 26, which is formed from an elastomer, are employed as a means for closing the flow channel 23 during storage in order to prevent liquid leakage. Forming the closing stopper 25 from such a resin makes it easy to form the closing stopper 25 in a predetermined shape, and dimensional variations of the closing stopper 25 arising during molding can be suppressed. Accordingly, liquid leakage during storage and opening problems in the flow channel 23 can be prevented, and furthermore, the closing stopper 25 can be prevented from deforming under pressure exerted thereon when moving within the flow channel 23, which makes it possible for the flow channel 23 to open with certainty without the closing stopper 25 becoming stuck partway along the flow channel 23.

Although the material of which the shape-retaining member 27 is formed is not particularly limited, it is preferable that the specific gravity thereof be no less than 1, and more preferably no less than two, so that shape-retaining member 27 can sink into the flat tire repair liquid L. This configuration prevents the disengagement of the shape-retaining member 27, which is caused by vehicle vibrations or the like, during storage and enables the engagement between the closing stopper 25 and the sealing member 26 to be stabilized. Furthermore, during flat tire repair work, the shape-retaining member 27 can be removed from the holding portions 25C using the weight of the shape-retaining member 27, which makes it possible to easily and securely remove the closing stopper 25. For example, aluminum, whose specific gravity is approximately 2.68, or stainless steel, whose specific gravity is approximately 7.89, do not rust easily and are thus preferable as the material having a specific gravity of no less than two.

The number of holding portions 25C is not particularly limited as long as a plurality are provided, but three to four are preferable so that the shape-retaining member 27 is held stably while also ensuring that the flow of the flat tire repair liquid L is not inhibited. It is preferable that the holding portions 25C be arranged at equal intervals around the periphery of the stopper portion 25A.

It is preferable that a diameter $R_B$ of the recessed portion 25B be set to be smaller than a diameter $R_A$ of the stopper portion 25A and a diameter $R_C$ of the holding portions 25C. Additionally, it is preferable that the diameter $R_B$ of the recessed portion 25B be greater than an inner diameter r of the sealing member 26. In other words, it is preferable that the diameters $R_A$, $R_B$, $R_C$, and r be set so as to satisfy the relationship $R_A$, $R_C > R_B > r$. Setting the diameters of the portions in this manner makes it possible for the closing stopper 25 to securely engage with the sealing member 26 during storage, which makes it possible to effectively prevent liquid leakage. Note that in the present technology, the diameter $R_C$ of the holding portions 25C is a value in a state in which the holding portions 25C hold the body portion 27A of the shape-retaining member 27.

Additionally, although the stopper portion 25A and the holding portions 25C may have the same diameters, it is preferable that the diameter $R_A$ of the stopper portion 25A be greater than the diameter $R_C$ of the holding portions 25C. In other words, it is preferable that the diameters $R_A$ and $R_C$ satisfy the relationship $R_A > R_C$. Setting the diameter $R_A$ of the stopper portion 25A to be greater than the diameter $R_C$ of the holding portions 25C in this manner makes it easier for the closing stopper 25 to disengage from the sealing member 26 when the shape-retaining member 27 is pushed out and the holding portions 25C deform so as to bend toward the center of the closing stopper 25. Note that when the size relationship of the diameters of the portions described above is combined with the above-described size relationship, it is preferable, in the present technology, that the diameters $R_A$, $R_B$, $R_C$, and r of the respective portions be set to satisfy the relationship $R_A \geq R_C > R_B > r$.

Figure 6A:
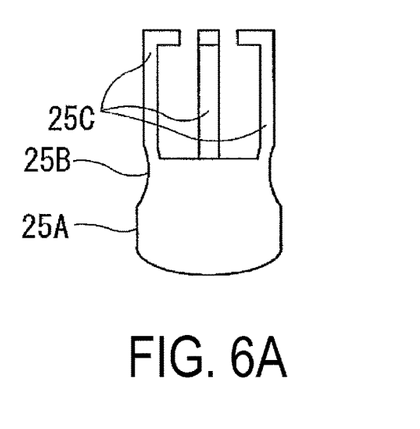
FIGS. 6A to 6C are cross-sectional views illustrating modified examples of the closing stopper.
Figure 6B:
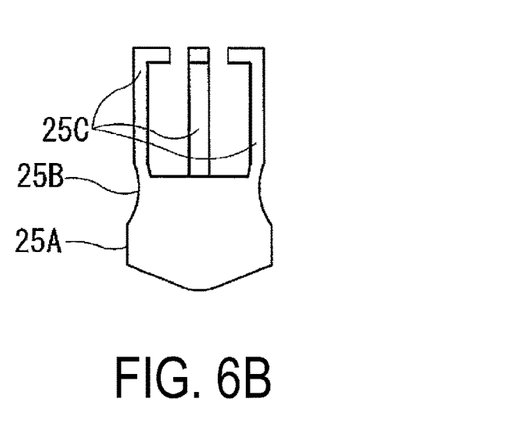
Figure 6C:
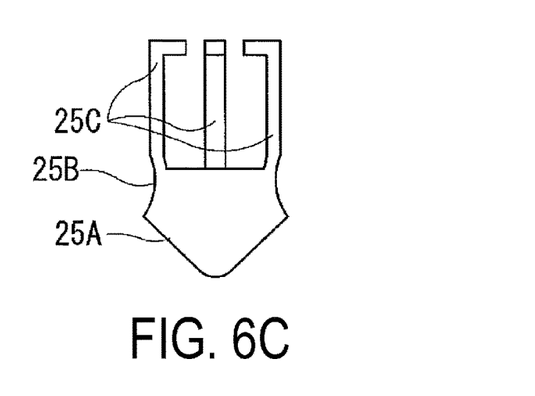

Although the end surface of the stopper portion 25A may be flat as in the example illustrated in FIGS. 1 to 5, it is preferable that this end surface be a convex surface that protrudes toward the outer side of the container, as illustrated in FIGS. 6A to 6C. Note that in FIG. 6A, the end surface of the stopper portion 25A has an elliptical shape when viewed in a cross-section, and in FIG. 6B, the end surface of the stopper portion 25A has a triangle shape whose tip is chamfered when viewed in a cross-section. Like FIG. 6B, in FIG. 6C, the end surface of the stopper portion 25A has a triangle shape whose tip is chamfered when viewed in a cross-section; however, in FIG. 6C, the stopper portion 25A is sloped from the area where the recessed portion 25B and the stopper portion 25A connect. Forming the end surface of the stopper portion 25A in such a shape makes it possible for air remaining in the flow channel 23 (the vertical hole section 23A) to escape effectively, which is beneficial for ensuring smooth movement of the closing stopper 25.

Although the length of the body portion 27A of the shape-retaining member 27 is not particularly limited, it is preferable that the length be greater than the thickness of the tip portions 25D of the holding portions 25C to ensure stability when the shape-retaining member 27 is held by the holding portions 25C.

Figure 7:
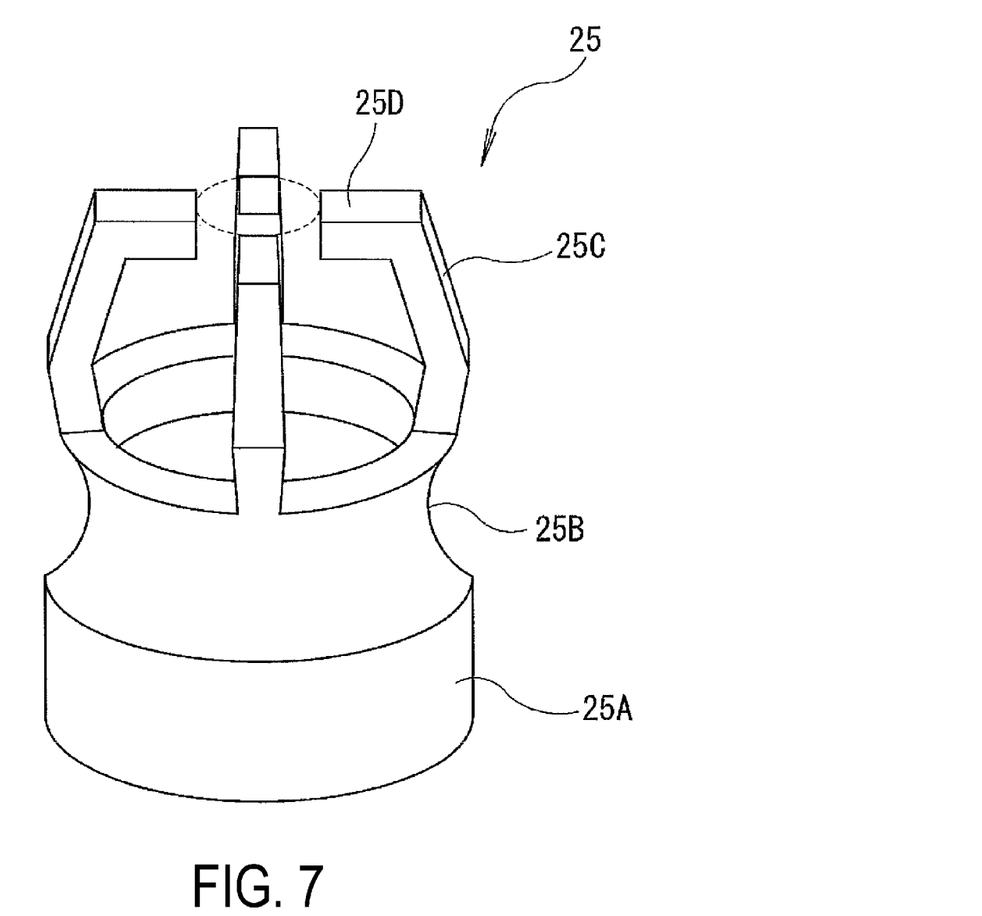
FIG. 7 is a perspective view illustrating an imaginary circle that makes contact with tip portions of holding portions.

Preferably, the diameter of the body portion 27A of the shape-retaining member 27 is 105% to 115% of the diameter of an imaginary circle inscribed in the tip portions 25D of the plurality of holding portions 25C (see the broken line in FIG. 7) when the closing stopper 25 is in an unloaded state. Setting the diameter of the body portion 27A of the shape-retaining member 27 in this manner makes it possible for the shape-retaining member 27 to be held securely by the holding portions 25C, which in turn makes it possible to prevent the disengagement of the shape-retaining member 27 from the holding portions 25C, which is caused by vehicle vibrations or the like, during storage.

In the manufacture of the stopping mechanism from the closing stopper 25, the sealing member 26, and the shape-retaining member 27, particularly when combining the closing stopper 25 and the shape-retaining member 27, these portions can easily be combined by, for example, simply inserting the shape-retaining member 27 into the holding portions 25C with the holding portions 25C bent toward the outer side of the closing stopper 25 using an external force to the extent that the outer stopper 27 of the shape-retaining member 27 passes through the holding portions 25C.

Although the pressure inside the container is approximately equal to atmospheric pressure at normal temperature, the pressure inside the container tends to increase depending on temperature conditions or the like (that is, higher temperatures) when the container is stored within the trunk or the like of the vehicle. It is thus necessary for the closing stopper 25 and the sealing member 26 to be engaged securely, even under conditions where the pressure inside the container is increased during storage. Accordingly, it is preferable that the closing stopper 25 be configured to be pushed out from the sealing member 26 and move within the flow channel 23 only upon the pressure inside the container reaching 150 kPa or higher. This configuration allows the flow channel 23 to be closed securely even if the pressure inside the container has changed due to a temperature change during storage and allows the flow channel 23 to be opened easily by the pressure of air supplied by a compressor during flat tire repair work.

Figure 8:
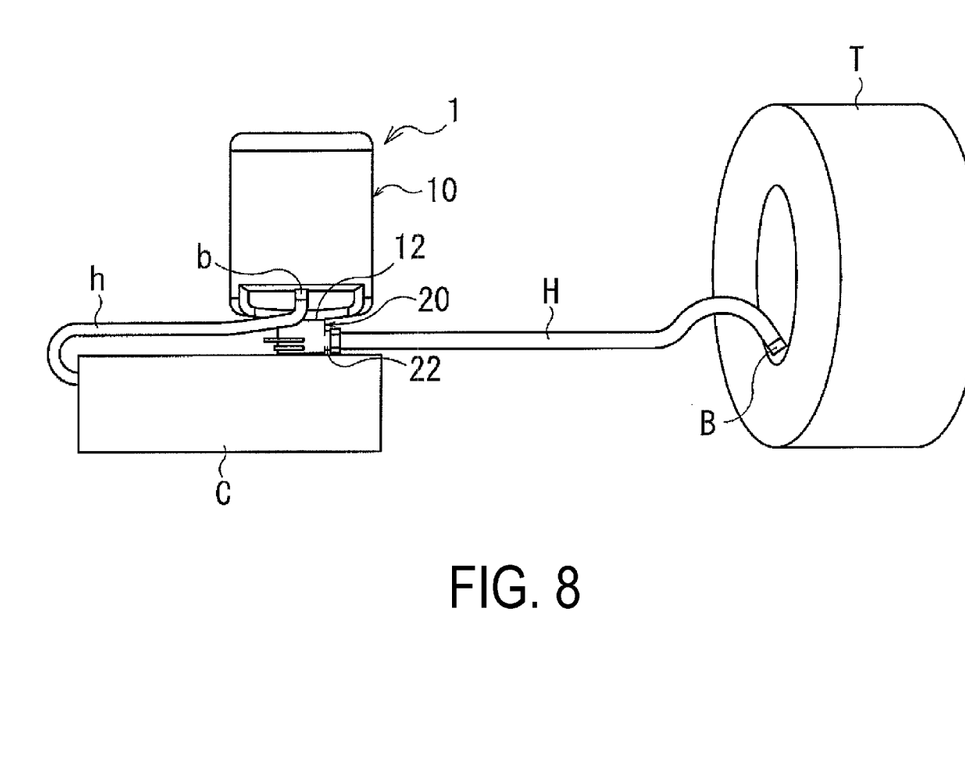
FIG. 8 is an explanatory view schematically illustrating the flat tire repair liquid container according to the present technology which is in use.

A method for injecting the flat tire repair liquid (flat tire repair work) using the flat tire repair liquid container 1 constituted of the container main body 10 and the cap 20 will be described below. Note that FIG. 8 schematically illustrates a state of the flat tire repair liquid container 1 which is in use.

During flat tire repair work, first, the cap 20 is attached to the container main body 10, which has been placed in an upright state. Note that in the case where a storage cap is already attached to the opening 12 of the container main body 10, the storage cap is replaced with the cap 20. At this time, in the case where a film covers the opening 12, the film is removed or broken. Meanwhile, one end portion of a hose H is fixed to the dispensing portion 22 of the cap 20 and the other end of the hose H is fixed to a valve B of a tire T, thus connecting the valve B of the tire T and the container 1. In addition, a compressor C is connected to the container 1 (in the case of FIG. 8, the compressor C is connected to a valve b provided in the container main body 10 via a hose h). Then, the container 1 connected to the tire T via the hose H is placed in an inverted state, with the opening 12 directed downward (the state illustrated in FIG. 8), and the compressor C supplies air to the interior of the container main body 10. At this time, the shape-retaining member 27, which has been held by the closing stopper 25, moves toward the outer side of the container due to the container being placed in the inverted state, which allows the closing stopper 25 to easily deform. The pressure inside the container rises due to the supplied air, and when a predetermined pressure (preferably no lower than 150 kPa) is reached, the closing stopper 25 disengages from the sealing member 26. At this time, the holding portions 25C of the closing stopper 25, which are free from the shape-retaining member 27 and can therefore deform, are compressed by the sealing member 26 and deform toward the center of the closing stopper 25, which enables the closing stopper 25 to disengage from the sealing member 26 smoothly. The closing stopper 25 moves along the flow channel 23 (the vertical hole section 23A) toward the outer side of the container and enters into the retaining section 23C, thus opening the flow channel 23 (resulting in the state illustrated in FIG. 1). The repair liquid L is supplied from the container main body 10 through the opened flow channel 23, and is injected into the tire T via the dispensing portion 22 and the hose H. In this manner, all of the flat tire repair liquid L within the container 2 is injected into the tire.

As such, the effects of employing the stopping mechanism constituted of the closing stopper 25 formed from a non-elastomer material, and the sealing member 26 formed from an elastomer material, or in other words, the effects of preventing liquid leakage effectively during storage and opening problems in the flow channel 23 can be achieved by this method for injecting the flat tire repair liquid (flat tire repair work) using the flat tire repair liquid container 1 according to the present technology.

The invention claimed is:

1. A flat tire repair liquid container comprising:
a container main body including a container body and an opening, the container body storing a flat tire repair liquid;
a cap including a mounting portion, a dispensing portion, and a flow channel, the mounting portion being mounted to the opening during flat tire repair work, the dispensing portion being configured to dispense the flat tire repair liquid outside of the container, the flow channel connecting the mounting portion and the dispensing portion; and
a stopping mechanism including:
a closing stopper formed from a resin that is a non-elastomer material, the closing stopper being capable of sliding within the flow channel,
a sealing member formed from an elastomer material, the sealing member being disposed in a ring shape conforming to an inner wall surface of the flow channel and configured to close a gap between the closing stopper and the flow channel and to hold the closing stopper at a predetermined position, and
a shape-retaining member configured to combine with the closing stopper during storage so as to keep the closing stopper in a restrained state in which the closing stopper does not disengage from the sealing member and to disengage from the closing stopper during flat tire repair work so as to release the closing stopper from the restrained state;
wherein the closing stopper includes a stopper portion that blocks the flow channel, a recessed portion that is adjacent to a side of the stopper portion positioned toward an inner side of the container and engages with the sealing member, and a plurality of holding portions that are adjacent to a side of the recessed portion positioned toward the inner side of the container, project toward the inner side of the container from a periphery of an end surface of the closing stopper positioned toward the inner side of the container, and hold the shape-retaining member;
the shape-retaining member includes a body portion held by the holding portions when closed, a recessed portion surrounded by tip portions of the holding portions when open,
an outer stopper having a diameter greater than the body portion in an end portion of the shape-retaining member positioned toward an outer side of the container, and an inner stopper having a diameter greater than an imaginary circle inscribed in the tip portions of the holding portions of the closing stopper in an end portion of the shape-retaining member positioned toward the inner side of the container; and
during storage, the closing stopper that is in the restrained state engages with the sealing member and closes the flow channel,
during tire repair work, the closing stopper that has been released from the restrained state by the shape-retaining member disengaging from the holding portions and the holding portions deforming toward a center of the closing stopper is pushed out from the sealing member by pressure inside the container and moved toward the outer side of the container in the flow channel to open the flow channel.

2. The flat tire repair liquid container according to claim 1, wherein a diameter $R_B$ of the recessed portion is smaller than a diameter $R_A$ of the stopper portion and a diameter $R_C$ of the holding portions in a state where the holding portions hold the shape-retaining member, and the diameter $R_B$ is greater than an inner diameter r of the sealing member.

3. The flat tire repair liquid container according to claim 1, wherein an end surface of the closing stopper positioned toward the outer side of the container is a convex surface projecting toward the outer side of the container.

4. The flat tire repair liquid container according to claim 1, wherein specific gravity of a material from which the shape-retaining member is formed is no less than two.

5. The flat tire repair liquid container according to claim 1, wherein a diameter of the body portion of the shape-retaining member that makes contact with the holding portions when closed is 105% to 115% of the diameter of the imaginary circle inscribed in the tips of the plurality of holding portions when the closing stopper is in an unloaded state.

6. The flat tire repair liquid container according to claim 2, wherein an end surface of the closing stopper positioned toward the outer side of the container is a convex surface projecting toward the outer side of the container.

7. The flat tire repair liquid container according to claim 6, wherein specific gravity of a material from which the shape-retaining member is formed is no less than two.

8. The flat tire repair liquid container according to claim 7, wherein a diameter of the body portion of the shape-retaining member that makes contact with the holding portions when closed is 105% to 115% of the diameter of the imaginary circle inscribed in the tips of the plurality of holding portions when the closing stopper is in an unloaded state.

* * * * *